(12) United States Patent
Borsarelli et al.

(10) Patent No.: US 7,854,312 B2
(45) Date of Patent: *Dec. 21, 2010

(54) PUSH DEVICE FOR TRANSFERRING GLASS ARTICLES

(75) Inventors: Gianclaudio Borsarelli, Cuneo (IT); Paolo Gianti, Busca (IT); Carlo Sesia, Cuneo (IT); Bruno Viada, Madonna Delle Grazie (IT)

(73) Assignee: Bottero S.p.A., Cuneo (IT)

( * ) Notice: Subject to any disclaimer, the term of this patent is extended or adjusted under 35 U.S.C. 154(b) by 293 days.

This patent is subject to a terminal disclaimer.

(21) Appl. No.: 11/876,344

(22) Filed: Oct. 22, 2007

(65) Prior Publication Data

US 2008/0118339 A1    May 22, 2008

(30) Foreign Application Priority Data

Oct. 20, 2006    (IT)    ................................ TO06A0759

(51) Int. Cl.
*B65G 25/00*    (2006.01)
(52) U.S. Cl. ........................ 198/429; 198/597; 198/493
(58) Field of Classification Search ................ 198/429, 198/430, 721, 734, 749; 65/260
See application file for complete search history.

(56) References Cited

U.S. PATENT DOCUMENTS

| | | | |
|---|---|---|---|
| 4,462,519 A | 7/1984 | Parkell et al. | |
| 4,466,532 A | 8/1984 | Minneman et al. | |
| 4,502,721 A | 3/1985 | Savin-Czeizler et al. | |
| 4,927,444 A | 5/1990 | Voisine | |
| 5,324,340 A | 6/1994 | Withrow et al. | |
| 5,429,651 A | 7/1995 | Bolin | |
| 5,733,354 A | 3/1998 | Voisine et al. | |
| 5,741,343 A | * 4/1998 | Lloyd et al. | .................... 65/260 |
| 5,755,847 A | * 5/1998 | Quayle | ........................ 65/260 |
| 5,988,355 A | 11/1999 | Merour | |
| 5,992,612 A | 11/1999 | Sidler et al. | |
| 6,151,918 A | 11/2000 | DiFrank et al. | |
| 6,494,063 B1 | 12/2002 | Malek | |
| 6,601,410 B1 | 8/2003 | Bögert et al. | |
| 6,668,591 B2 | 12/2003 | Flynn | |

(Continued)

FOREIGN PATENT DOCUMENTS

DE    29922204    3/2000

(Continued)

OTHER PUBLICATIONS

U.S. Appl. No. 11/876,358, filed Oct. 22, 2007, Borsarelli et al.

(Continued)

*Primary Examiner*—Mark A Deuble
(74) *Attorney, Agent, or Firm*—Sheridan Ross P.C.

(57) ABSTRACT

A push device, for transferring glass articles from an intermediate supporting plate to an unloading conveyor, has at least one seat bounded by two flat supporting surfaces converging with each other and forming between them an angle of over 90°, and by at least one further supporting surface adjustable in position with respect to at least one of the two flat supporting surfaces; the article being retained close to a convergence area of the two flat supporting surfaces by a circuit for feeding compressed air between the two flat supporting surfaces.

12 Claims, 1 Drawing Sheet

U.S. PATENT DOCUMENTS

| | | |
|---|---|---|
| 6,702,097 B1 | 3/2004 | Leidy et al. |
| 7,047,766 B2 | 5/2006 | Schneider et al. |
| 7,278,529 B2 | 10/2007 | Borsarelli et al. |
| 7,320,230 B2 | 1/2008 | Lockhart |
| 7,325,668 B2 | 2/2008 | Borsarelli et al. |
| 2006/0179884 A1 | 8/2006 | DiFrank et al. |
| 2008/0282739 A1 | 11/2008 | Cramer |
| 2009/0000337 A1 | 1/2009 | Cramer |

FOREIGN PATENT DOCUMENTS

| | | |
|---|---|---|
| EP | 1213487 | 6/2002 |
| EP | 1772436 | 4/2007 |
| GB | 2292551 | 2/1996 |

OTHER PUBLICATIONS

U.S. Appl. No. 12/027,758, filed Feb. 7, 2008, Armando et al.
Background of the Invention for the above-captioned application (previously provided).
European Search Report for European Patent Application No. 07119022.7, mailed Feb. 12, 2008.

\* cited by examiner

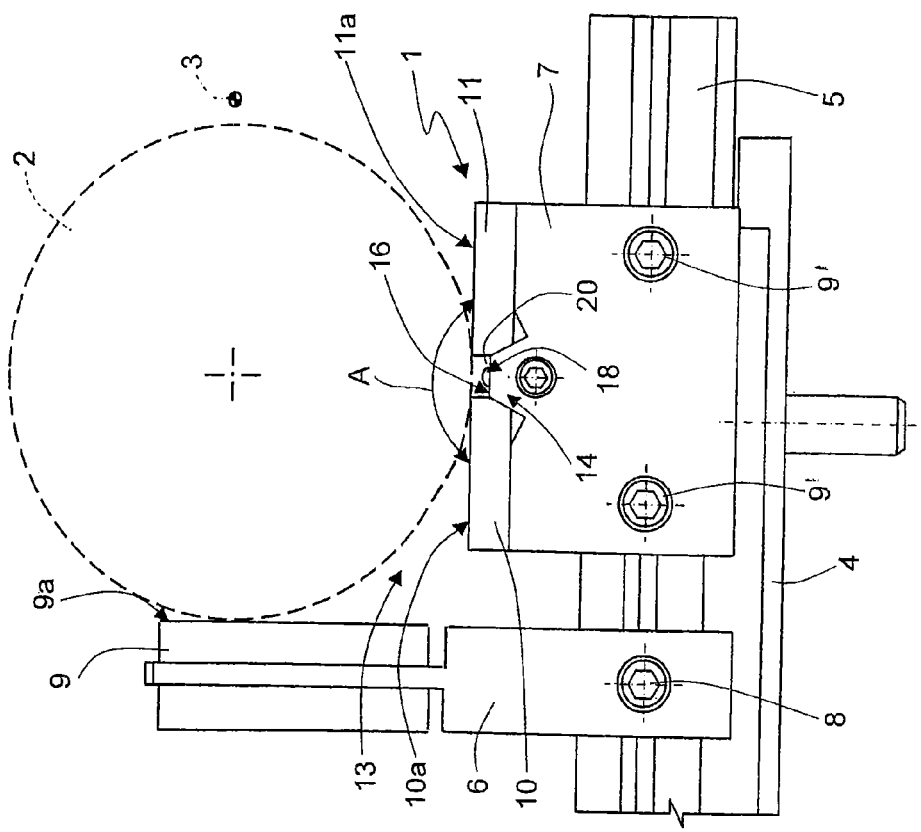
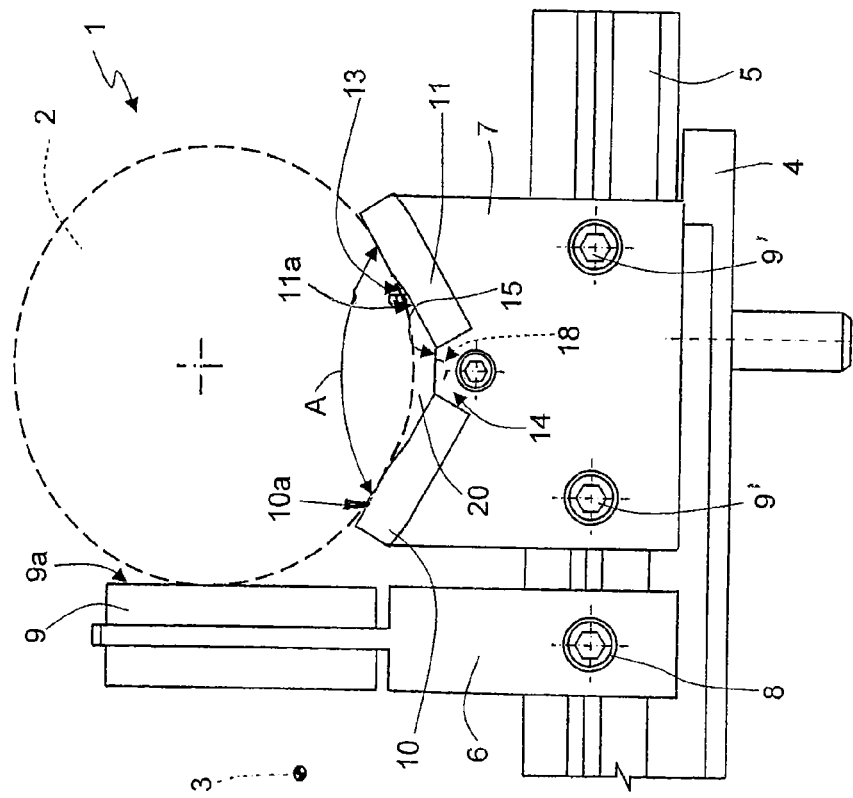
Fig.1
Fig.2

PUSH DEVICE FOR TRANSFERRING GLASS ARTICLES

The present invention relates to a push device for transferring glass articles on an I.S. machine.

BACKGROUND OF THE INVENTION

In the manufacture of hollow glass articles, molding machines are used, in which the articles extracted from respective molds are first transferred onto a horizontal supporting plate, and from this onto an unloading conveyor belt. The hollow articles are transferred from the supporting plate to the conveyor by means of a push device, which pushes them along a substantially 90° arc.

The push device comprises a holder having at least one compartment bounded by a rear and a lateral supporting wall forming a right-angle. As the holder rotates along the transfer arc, the hollow article is retained inside the right-angle, resting against the supporting walls, by a stream of compressed air flowing upwards along a substantially vertical channel defined by the supporting walls on one side, and the hollow article on the other.

Though widely used, known solutions of the type described are not altogether satisfactory, by sometimes failing to hold the article stably inside the compartment, regardless of the shape/size of the article and the initial position of the article with respect to the holder, and by sometimes causing visible damage to the article, particularly the parts of it contacting the supporting walls, thus resulting in poor-quality finished products, the necessity to detect and reject any flawed articles, and, hence, in a low output rate of the machine.

SUMMARY OF THE INVENTION

It is an object of the present invention to provide a push device designed to retain glass articles of any shape and size precisely and reliably as they are transferred onto the conveyor, and without impairing the structural characteristics or appearance of the articles.

According to the present invention, there is provided a push device for transferring glass articles from an intermediate supporting plate to an unloading conveyor; the push device comprising two supporting surfaces for said article, and a circuit for feeding compressed air between said two supporting surfaces; and being characterized by also comprising a further supporting surface for said article.

The push device as defined above preferably also comprises adjusting means for adjusting the position of said further supporting surface with respect to at least one of said two supporting surfaces.

Said adjusting means conveniently comprise a guide-slide assembly for adjusting the distance between said further supporting surface and one of said two supporting surfaces in a substantially straight direction.

Said further supporting surface is conveniently located alongside one of said two supporting surfaces.

BRIEF DESCRIPTION OF THE DRAWINGS

A non-limiting embodiment of the invention will be described by way of example with reference to the accompanying drawings, in which:

FIG. 1 shows a schematic plan view of a preferred embodiment of a push device in accordance with the teachings of the present invention;

FIG. 2 shows the same view as in FIG. 1, of a variation of a detail in FIG. 1.

DETAILED DESCRIPTION OF THE INVENTION

Number 1 in FIG. 1 indicates as a whole a push device for transferring glass articles 2 from a horizontal intermediate supporting plate 3, known as a "dead plate", onto a known unloading conveyor not shown in the drawings.

In the example described, device 1 comprises an attachment portion 4 fitted to a movable member of a known actuating assembly (not shown) which moves device 1 along a predetermined path between supporting plate 3 and the conveyor.

As shown in FIG. 1, attachment portion 4 is fitted integrally with a straight guide 5, and with two independent attachment bodies 6, 7, both of which are fitted to and run independently along guide 5, and are locked in position as required with respect to each other by means of respective screws 8 and 9'.

As shown in FIG. 1, body 6 is fitted integrally with a lateral supporting wall 9 bounded by a supporting surface 9a extending perpendicularly to guide 5 to define a lateral support for article 2; and body 7 is fitted integrally with two rear plate-like supporting walls 10, 11 defining, together with lateral wall 9, a seat 13 for article 2.

As shown in FIG. 1, rear walls 10, 11 are located side by side at a rear end of wall 9, converge towards guide 5, and have respective flat surfaces 10a, 11a for supporting article 2, and which form an angle A of 110 to 150 degrees, preferably 120 degrees, and are connected to each other at a convergence area 14 by a flat surface 15, which is perpendicular to wall 9, bounds convergence area 14, and forms the same angle with both surfaces 10a, 11a. As shown in FIG. 1, supporting surface 9a extends substantially parallel to the bisector of the angle formed by surfaces 10a, 11a.

In the FIG. 2 variation, surfaces 10a, 11a are coplanar, are perpendicular to supporting surface 9a of wall 9, and terminate with respective facing edges coincident with the edges of a rectangular-cross-section recess 16, as shown in FIG. 2.

An outlet 18 of a pneumatic circuit—for example, of the type described in Italian Patent Application n. TO2005A000713 filed by the present Applicant on 7 Oct. 2005, and to which reference is made herein as required for the sake of clarity—comes out inside convergence area 14 of walls 10 and 11, close to surface 15 in the FIG. 1 solution, or inside recess 16 in the FIG. 2 solution. The pneumatic circuit feeds compressed air between walls 10 and 11, or into recess 16, to exert suction on and so hold article 2 against walls 9, 10, 11 as it is transferred from intermediate supporting plate 3 to the conveyor.

In actual use, device 1 is adjusted to the size of article 2 for transfer, by moving bodies 6 and 7 along guide 5 into the best positions with respect to each other and with respect to attachment portion 4, and then locking bodies 6 and 7 by tightening screws 8 and 9.

Once article 2 is seated inside seat 13, air is fed between walls 10 and 11, so that article 2 is sucked immediately onto surfaces 9a, 10a, 11a, and forms, with parts of surfaces 10a and 11a, a conduit or channel 20 which, compared with known solutions, and because of the particular mutual arrangement of walls 10 and 11, has a much flatter, regular flow section—even rectangular in the FIG. 2 solution. What is more, compared with known solutions, the flow section formed by the particular mutual arrangement of walls 10 and 11 is also much smaller. Tests show that, using a regular flow section, in which airflow speed is substantially the same at different points, the force holding article 2 on walls 9, 10, 11 can be controlled much more accurately, thus preventing denting or scoring of the lateral surface of article 2, and so maintaining the original quality of the transferred article.

Unlike known solutions, in device 1 as described, the original quality of the transferred article is also maintained by virtue of the article resting on the device at three distinct points at a distance from one another, and the points at which the article rests on or contacts the supporting surfaces being selected precisely as a function of the size and, in general, the shape and size of the article, so that, for a given retaining force exerted by the airflow, the specific pressure at each point of contact is exactly the same, and definitely less than that at the contact points of known solutions with only two supporting points. This is mainly due to device 1 enabling adjustment of the relative positions of the supporting surfaces as a function of the transverse dimensions of the article, as well as the positions of the supporting surfaces with respect to attachment portion 4, thus obtaining a device that is efficient, balanced, and, generally speaking, adjustable to the article for transfer.

As will be clear from the above description, the device is quick and easy to adjust, and so involves no appreciable increase in setup time as compared with known solutions.

Clearly, changes may be made to device 1 as described herein without, however, departing from the scope defined in the accompanying Claims.

In particular, the angles between the supporting surfaces of walls 9, 10, 11 and/or the geometry of walls 10, 11, at convergence area 14, defining the compressed-air flow passage, may differ from those indicated by way of example.

The positions of the supporting surfaces may be adjusted differently from the method shown, e.g. using a discrete positioning device, in which each position setting corresponds to a specific article for transfer.

What is claimed is:

1. A device, comprising:
   an attachment portion interconnected to a movable member of an actuating assembly;
   first, second, and third supporting surfaces adapted to receive a glass article, the first, second, and third supporting surfaces having a first position of use adjacent to an intermediate supporting plate and a second position of use adjacent to an unloading conveyor;
   an outlet adapted to provide compressed air between the first and second supporting surfaces; and
   adjusting means adapted to adjust the position of the third supporting surface with respect to at least one of the first and second supporting surfaces;
   wherein the first and second supporting surfaces define an angle therebetween, and wherein the third supporting surface extends substantially parallel to a bisector of the angle formed between the first and second supporting surfaces.

2. The device of claim 1, wherein the adjusting means comprise a guide-slide assembly for adjusting the distance between the third supporting surface and one of the first and second supporting surfaces in a substantially straight direction.

3. The device of claim 2, wherein the guide slide is fitted integrally with the attachment portion, wherein the first and second bodies are adapted to move independently along the guide slide, and wherein the first and second bodies each have at least one screw to lock the first and second bodies into position on the guide slide.

4. The device of claim 1, wherein the third supporting surface is located alongside one of the first and second supporting surfaces.

5. The device of claim 1, wherein the third supporting surface forms a substantially ninety-degree angle with at least one of the first and second supporting surfaces.

6. The device of claim 5, wherein the third supporting surface forms a 90° angle with the first and second supporting surfaces.

7. The device of claim 1, wherein the first and second supporting surfaces form between them an angle of over ninety degrees.

8. The device of claim 7, wherein the angle formed between the first and second supporting surfaces ranges between a hundred and ten and a hundred and fifty degrees.

9. The device of claim 1, wherein an angle between the first and second supporting surfaces is non-orthogonal, and wherein the first supporting surface is non-orthogonal to the third supporting surface.

10. The device of claim 1, wherein the first and second supporting surfaces are substantially parallel, and wherein each of the first and second supporting surfaces is transverse to the third supporting surface.

11. The device of claim 1, wherein a trajectory, at the outlet, of the compressed air is substantially transverse to the first and second supporting surfaces.

12. The device of claim 1, wherein the attachment portion further comprises a first body interconnected to the first and second supporting surfaces and a second body interconnected to the third supporting surface.

* * * * *